United States Patent [19]

Williamson

[11] 3,889,823
[45] June 17, 1975

[54] AUTOMATIC BALE STOOKER

[76] Inventor: George Williamson, R.R. No. 2, Red Deer, Alberta, Canada

[22] Filed: Mar. 13, 1973

[21] Appl. No.: 340,678

[52] U.S. Cl. .............................. 214/6 B; 214/152
[51] Int. Cl. ........................................ B65g 57/32
[58] Field of Search .................... 214/6 B, 9, 152

[56] References Cited
UNITED STATES PATENTS

| | | | |
|---|---|---|---|
| 3,135,554 | 6/1964 | Williamson | 214/9 X |
| 3,158,270 | 11/1964 | Prentice | 214/6 B |
| 3,223,253 | 12/1965 | Garbe et al. | 214/6 B |
| 3,370,719 | 2/1968 | Oler | 214/6 B |
| 3,512,659 | 5/1970 | Vanderkrogt | 214/6 B |
| 3,589,533 | 6/1971 | Miller | 214/6 B |
| 3,680,717 | 8/1972 | Russ | 214/6 B |

*Primary Examiner*—Robert J. Spar
*Assistant Examiner*—Leslie J. Paperner
*Attorney, Agent, or Firm*—John E. Prothroe

[57] ABSTRACT

Apparatus and method for constructing a six-bale stock of 3 - 2 - 1 "shingled" configuration from bales having unequal cross-sectional rectangular dimensions. Bales discharged from a baler are elevated in an inclined chute into position and orientation for automatic release onto a forked stook platform, so positioned that a stook is assembled of the desired shingled configuration, the bales oriented with regard to major and minor cross-sectional dimensions. When the stook is fully assembled, the pivoted stook platform is automatically tripped for ground discharge of the stook, and after discharge returns automatically to loading position.

11 Claims, 8 Drawing Figures

AUTOMATIC BALE STOOKER

This invention relates to new and useful improvements in apparatus for assembling bales of hay, straw or the like, in pyramid-type stooks, of triangular cross-section, having upwardly sloping roof walls terminating in a ridge, planar anterior and posterior surfaces, and a generally flat base.

When hay has been cut and field cured, it is subsequently compressed into bales for handling. It is desirable to assemble the individual bales into multiple groupings or "stooks" in order to facilitate subsequent handling, field pick-up and hauling to storage.

The pyramidal stook, because of its bale interlocking characteristic, forms a sturdy structure that is not easily disturbed by wind, storm or settling of the hay within the bale.

It is further desirable, when hay, straw or the like being baled is not completely field cured and therefore contains a moisture content that is excessive for immediate storage, that the stooks be formed in a configuration with exposes the greatest surface area of the bales comprising the stook to the drying elements of sun and air, in order to avoid heating and spoilage.

Further if the stooks should be rained upon before more permanent storage can be arranged, it is advantageous to expose the greatest bale surface area to the drying elements.

It is also of importance that the bales be assembled in a pyramidal stook so that the bales comprising the bottom row in the stook do not lie flat upon the damp ground, to absorb moisture over a large area; it is also desirable that ventilation be provided between the ground and the under-surface of the stook. Thus, orientation of the lowermost bales within a stock upon their edges, as opposed to their flat sides, affords a minimum of ground contact, and permits air circulation adjacent the under sides of these bales.

The triangular ventilation spaces between the ground and the adjacent under sides of the lowermost bales, also provides access for tine or fork penetration, for mechanical lifting and moving equipment, such as bale forks.

It is heretofore been normal practise to form the pyramid stook by hand, because of its difficulty in construction, which will be apparent from a consideration of the cross-section dimensions of a conventional hay bale, and most popular size being approximately 14 × 18 inches, although bales of 16 × 18 inches cross-sectional dimensions are increasing in popularity. The length of bales is determined by optional adjustment of the baler, generally having regard to the weight of the hay or straw. A weight of from 80 to 100 pounds is generally regarded as optimum, which is achieved with a bale of approximately 48 inches in length. The difference in cross-sectional dimensions of the bales adds to the stability of the stock, but also increases the difficulty in constructing the pyramid type stock, because the bales are discharged from the baler with the longer cross-sectional dimension uniformly oriented; selective positioning and rotation of some of the bales becomes necessary, in order to form the assembled stook, and this requirement has heretofore mitigated against the success of fully automatic bale stookers producing a pyramidal stook in which bales are of predetermined orientation.

Bale stookers have heretofore been proposed, which fall generally into one of two classes:

i. Manual apparatus, comprising a platform supported on ground-engaging wheels, for attachment in following relation to a baler, and a bale piling fork in pivotal attachment to the training edge of the platform and in horizontally disposed position; in addition to the operator required for the baler or tractor-baler, a second operator is required to stand on the platform in order to manually build the pyramidal stook of the desired configuration and proportions, for ultimate depositing on the ground; and ii. Automatic apparatus, in which the pyramidal stock is built automatically by means of bale delivery means, sequentially programmed.

The first class of bale stooker is expensive of labour, requiring one additional operator is excess of the baler operator; the second class has heretofore involved relatively complex apparatus, which is not adapted to the severe conditions of baler operations, and because of its complexity is expensive to manufacture.

The apparatus of the present invention is designed fully automatically to produce a six-bale stooks, of pyramidal configuration, when secured in following attachment to a travelling baler. The stooker receives the bales from the bale chamber of the baler, and automatically stacks the bales into a pyramid, each bale being automatically oriented in proper configuration having regard to its major and minor cross-sectional dimensions, into a 3-2-1 pyramidal form on a carrier from which the bales are discharged in a stook onto the ground. The carrier is normally held horizontally disposed while the stook is being formed, and is automatically released, when the stook is completed, for ground contact of the stook.

The stooker also includes means of attachment to the leading baler, allowing the baler and stooker to articulate readily in relation to each other, when passing over uneven ground, and when manoeuvring through short radius turns.

In its broader aspect, the apparatus of the present invention comprises a horizontally disposed chassis with single axle and associated pair of ground-engaging wheels; an elevating ramp adapted to receive bales upon discharge from the baler for upward guidance under urging from following bales, to bale receiving and positioning means; release means whereby the bale, after positioning and orientation by the bale receiving and positioning means, is dropped onto a piling fork for construction of the stook, and release means whereby the stook, when fully constructed, is automatically dropped to the ground for separation from the piling fork in response to the forward motion of the stooker apparatus relative to the ground.

Other and more specific features, advantages and objects of the invention will appear from the detailed description hereinafter following, reference being had to the accompanying drawings which form apart of this disclosure and which illustrate, merely by way of example, a preferred form of the apparatus for the practice of this invention. In the drawings:

In the drawings, like characters of reference indicate corresponding parts in the several figures.

STRUCTURE

Figure 1:
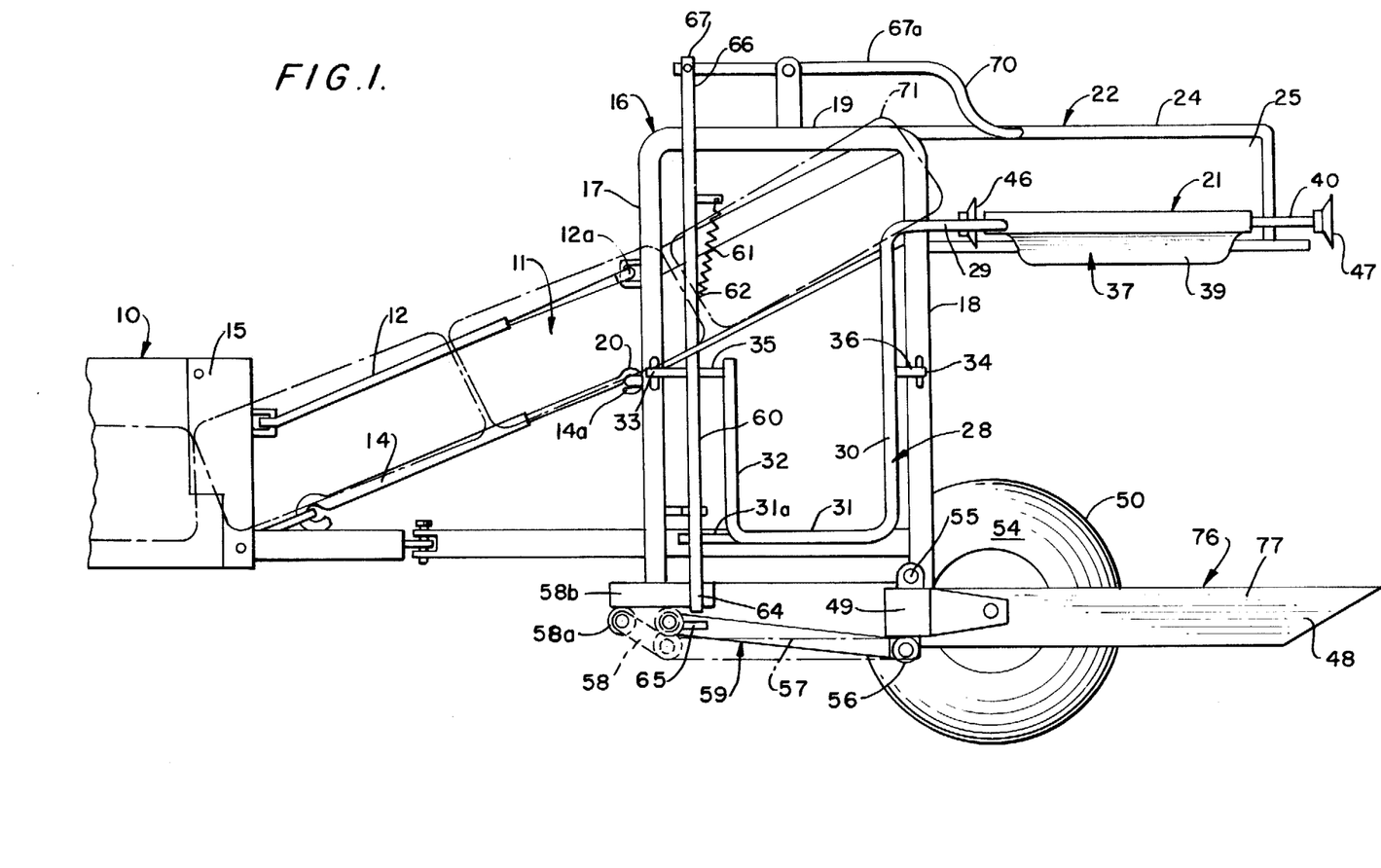
FIG. 1 is a side elevation partly in fragment of the stooker shown in attachment to a travelling baler, the latter in fragment only, depicting in phantom the movement of bales from the bale chamber up the inclined bale elevating ramp to the bale receiving and positioning station.

Proceeding therefore to describe the invention in detail, reference should be first made to FIG. 1, in which a bale chamber 10 of a travelling baler is depicted in fragment, to discharge uniform bales having unequal cross-sectional dimensions, the major dimension normally being the horizontal dimension as discharged from the baler, the minor dimension being vertical.

Bale Elevating Ramp

The bale elevating ramp generally designated 11 in FIG. 1 is of general trough configuration, comprising a pair of upper lateral guides 12 and 13 (hidden from view), and a single bottom guide 14. Each of the ramp guides 12, 13 and 14 is pivotally secured at its lower or forward end to a bale chamber connecting from 15, which in turn is adapted for bolted connection to the bale chamber 10, as depicted in FIG. 1.

The ramp guides 12, 13 and 14 are each of telescopic construction, so that articulation of the stooker chassis may be effected, as will be hereinafter explained.

Figure 2:
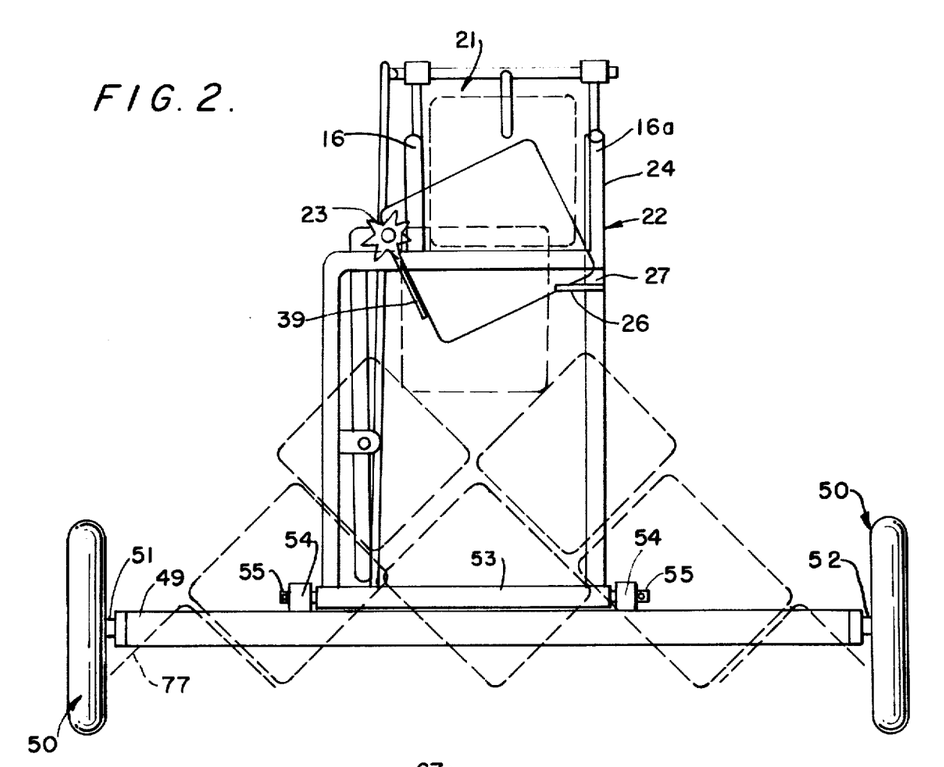
FIG. 2 is an end elevation of the apparatus of FIG. 1, looking forwarding, with the bales of a partially assembled stook depicted in phantom.
Figure 3:
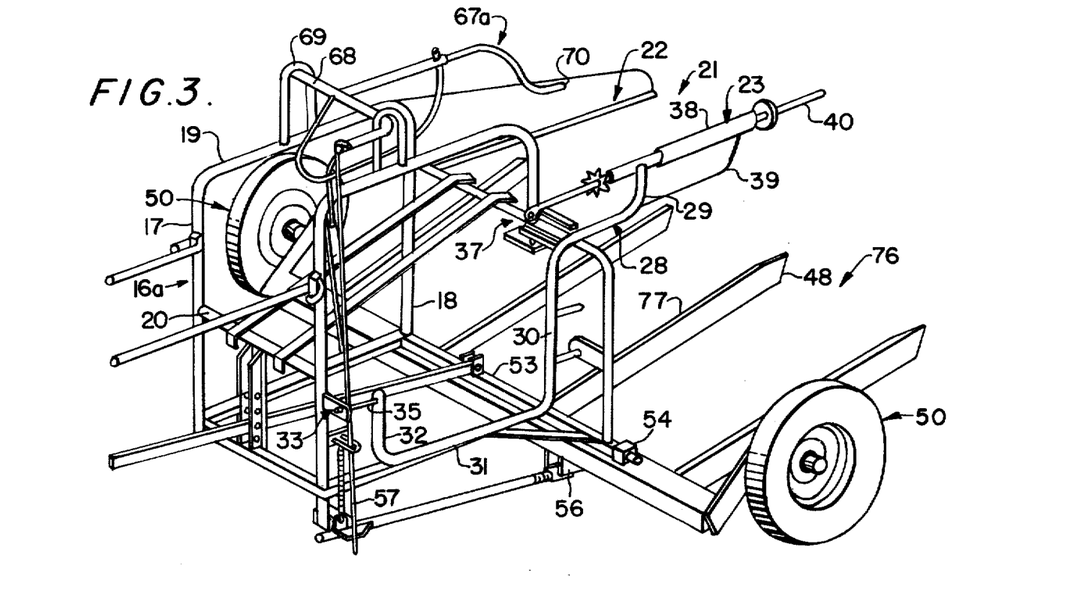
FIG. 3 is a perspective view of the apparatus of FIG. 1 with the bale elevating ramp removed.

The elevating ramp guides 12, 13 and 14 respectively are pivotally secured at their rearward and upper ends 12a, 13a and 14a respectively to the main vertical frames of the stooker structure generally designated 16 and 16a, FIGS. 1 and 2. The main vertical frames 16 and 16a are generally similar, and each comprises a pair of vertical members 17 and 18, FIGS. 1 and 3 and a horizontal member 19 inter-connecting the vertical members 17 and 18 at their upper ends. The main vertical frames 16 and 16a are positioned symetrically upon a stooker chassis, of generally triangular configuration, as depicted in FIGS. 1 and 2, and are spaced apart so that the upwardly passing bales will freely traverse between the vertical frame members 16 and 16a. The bottom guide 14 is pivotally secured at its rearward upper end 14a to a cross brace 20, horizontally disposed between the forward vertical members 17 of the main vertical frame members 16 and 16a, as depicted in FIG. 1.

Bale Positioning Means

Turning now to the bale positioning station, depicted generally at 21 in FIG. 1, this comprises generally a pair of mutually co-operating bale support arms 22 and 23 respectively extending horizontally rearwardly from the main vertical frame members 16 and 16a. One of the bale support arms, designated generally 22 in FIGS. 1 and 2, comprises a rearwardly extending rectangular elongated tubular frame member 24, to which is secured a rigid mesh 25, forming the surface of the fixed bale support arm 22. A rigidly secured trip member 26 is positioned at the bottom edge 27 of the bale support arm 22 and extends inwardly therefrom as depicted in FIG. 2, in order to engage and rotate each bale as it drops downwardly out of the bale receiving and positioning station 21, as will be hereinafter explained.

Figure 5:
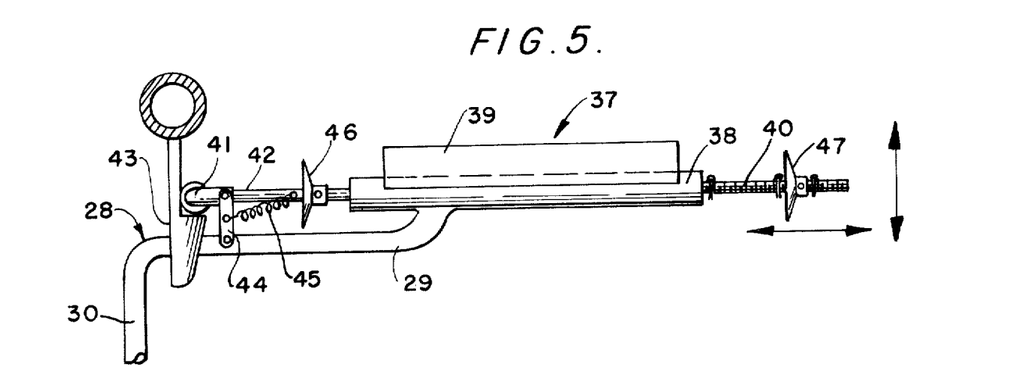
FIG. 5 is a plan view of the bale release mechanism of FIG. 4.
Figure 6:
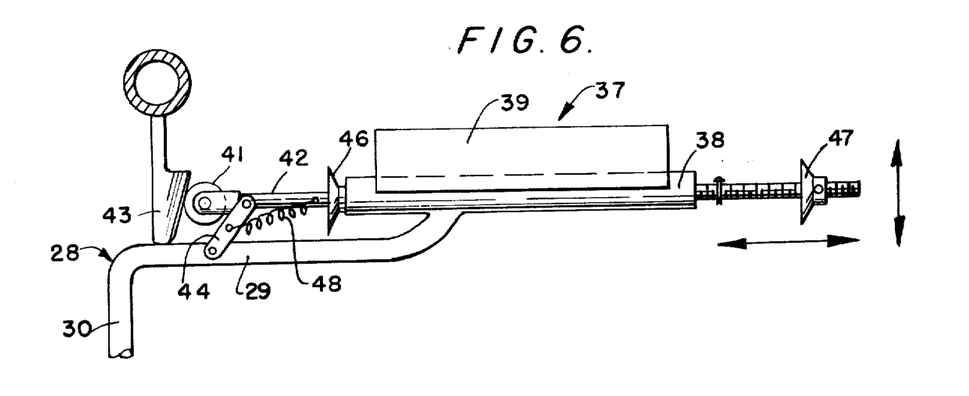
FIG. 6 depicts the bale release mechanism of FIG. 5 in position for unloading of a bale therefrom.

The opposite bale support arm generally designated 23, is depicted in detail in FIGS. 5 and 6, and includes operable bale release means whereby each bale introduced into the bale receiving and positioning station 21 is released downwardly therethrough as it reaches a predetermined release position as will also be hereafter explained. The bale support arm 23 includes a rigid tubular member generally designated 28, formed in one piece having a horizontally and forwardly extending portion 29, a vertically downwardly extending straight portion 30 formed from a right angle bend to portion 29, a horizontally and forwardly extending straight portion 31 formed from a right angle bend to portion 30, and a vertically upwardly extending straight portion 32 formed from a right angle bend to portion 31, all as described and depicted in FIGS. 1 and 2. A stop member 31a, the purpose of which is described hereinafter, extends forwardly of portion 31 and is rigidly attached thereto at the bend with portion 32.

The bale support arm 23 is pivotally connected to the main vertical frame member 16 at journal bearing 33 and 34 by means of horizontal stub axles 35 and 36 secured, respectively, to the distal end of the upwardly extending portion 32 of the bale support arm 23, and to an intermediate point on the downwardly extending straight portion 30 of the pale support arm 23, all is depicted in FIG. 1.

That portion of the bale support arm 23 comprising the upwardly extending portion 32, the horizontally extending portion 31 and the lower portion below the pivot 33 of the downwardly extending portion 30, serves as a counterweight in order normally to maintain the major plane of the bale support arm 23 in a vertical position, as depicted in FIGS. 1 and 2.

Figure 4:
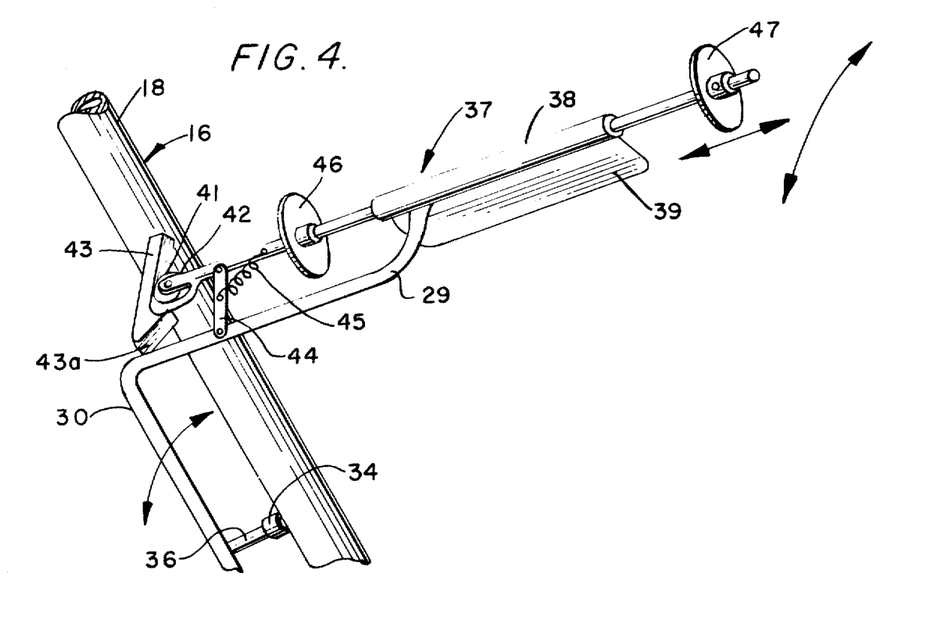
FIG. 4 is an enlarged perspective view of a portion of the bale receiving and positioning station with portions broken away, depicting the pivoted bale support arm and bale release mechanism mounted thereon, in position for loading of a bale therein from the bale elevating ramp.

A catch means generally designated 37, FIG. 1, the structure of which will now be described, operates, automatically selectively in response to the sequential loading of bales into the stooker, to retain the pivoted bale support arm 23 in its vertical position or to release the bale support arm 23 for pivotal sidewards movement. Reference to FIGS. 4 and 5 will depict the rearwardly extending tubular portion 29 of the bale support arm 23 to which is rigidly secured to tubular sleeve 38, similarly rearwardly extending in parallel relationship to said portion 29. A planar rectangular bale guide 39 is secured as by bolting to the tubular sleeve 38, as depicted in FIG. 4, inclined downwardly and inwardly as depicted in FIG. 2. It will be appreciated that the bale guide 39, the elongated tubular sleeve 38 and the bale support arm 23 are unitarily rigid.

An actuating rod 40, is mounted to be longitudinally slidable within the tubular sleeve 38, FIG. 4, 5 and 6. A roller-nosed catch 41 is secured to the forward end 42 of the actuating rod 40, which catch engages with a stop member 43 secured as by welding to the main vertical frame 16 of the apparatus. Spring biasing means comprising a pivot link 44, pivoted at its ends to each of the forward extending portion 29 of the bale support arm 23 and the actuating rod 40, and an associated tension spring 45 attached to the pivot link 44 at a point intermediate its ends and to the actuating rod 40 at a point adjacent to but spaced remotely from the forward end 42 thereof, all co-operate to urge the actuating rod forwardly within the tubular sleeve 38, as depicted in FIG. 5.

A pair of disc-shaped stops 46 and 47 respectively are adjustably secured as by set screws to the actuating rod 40 adjacent each of its respective ends, as depicted in FIG. 4.

From the foregoing description of the structure of the catch means 37, it will be appreciated that when the stop 43 is engaging in roller-nosed catch 41, pivotal movement of the bale support arm 23 about the stub axles 35 and 36 and associated journal bearings 34 and 33, will be restrained. Rearward travel of the actuating rod 40 against the biasing of the spring 45 will release the catch 41 from the stop 43, permitting rotational movement of the bale support arm 23 within the bearings 33 and 34 in a counter-clockwise sense as viewed in FIG. 2.

Stook Platform

A platform 76 for receiving the bales upon their discharge from the bale receiving and positioning station 21, including a pair of ground-engaging wheels and axle assembly, is pivotally secured at its forward edge to the trailing edge of the chassis of the bale stooker, as will be hereinafter described. The platform includes four rearwardly extending fork tines 77, generally pointed at their trailing ends 48, rigidly secured in co-planar cantilever aspect to a cross-member 49, FIG. 2. A pair of ground-engaging wheel assemblies, each generally designated 50, including stub axles 51 and 52, are secured to the distal ends of the cross-member 49, the entire assembly being so adapted that the fork tines 77 will form a planar platform upon which bales, when discharged from the bale positioning and receiving station 21, will lodge, in angular aspect as depicted in FIG. 2, in order to form a pyramidal stook of which the bottom course will comprise three bales, the second course two bales, and the third course a single bale, to complete the pyramid. The tines 77 are spaced apart to freely support the bales of the lower course when the bales are angularly disposed therebetween, as depicted in FIG. 2, while permitting a portion of the bales to extend downwardly therethrough for contact with the surface of the ground when the stock discharge mechanism is tripped, as will be hereinafter described.

The platform cross-member 49 is pivotally secured to the trailing cross-member 53 of the stooker chassis, by a pair of journalled brackets 54 welded to the upper surface of the cross-member 49, which engage a pair of stub axles 55 secured to the chassis as depicted in FIG. 2.

It will be understood from the foregoing description of the axle and bale platform assembly that this assembly will pivot about the journalled axles 55 from a loading position in which the platform 76 is horizontal, to an unloading position in which the platform 76 is inclined downwards rearwardly until the trailing ends 48 of the tines 77 are in ground contact. Means associated with the axle assembly now to be described, and also disclosed in my U.S. Pat. No. 3,135,554, "Bale Stooker," are provided for locking the bale platform 76 in horizontal position and for tilting the platform 76 downwardly for discharge of the assembled bale stook and subsequent tilting of the platform 76 upwardly into a horizontal bale receiving position in response to the counterbalance effort about the pivoted journals 54 of the weight of the upper portion of the entire stooker assembly.

Figure 7:
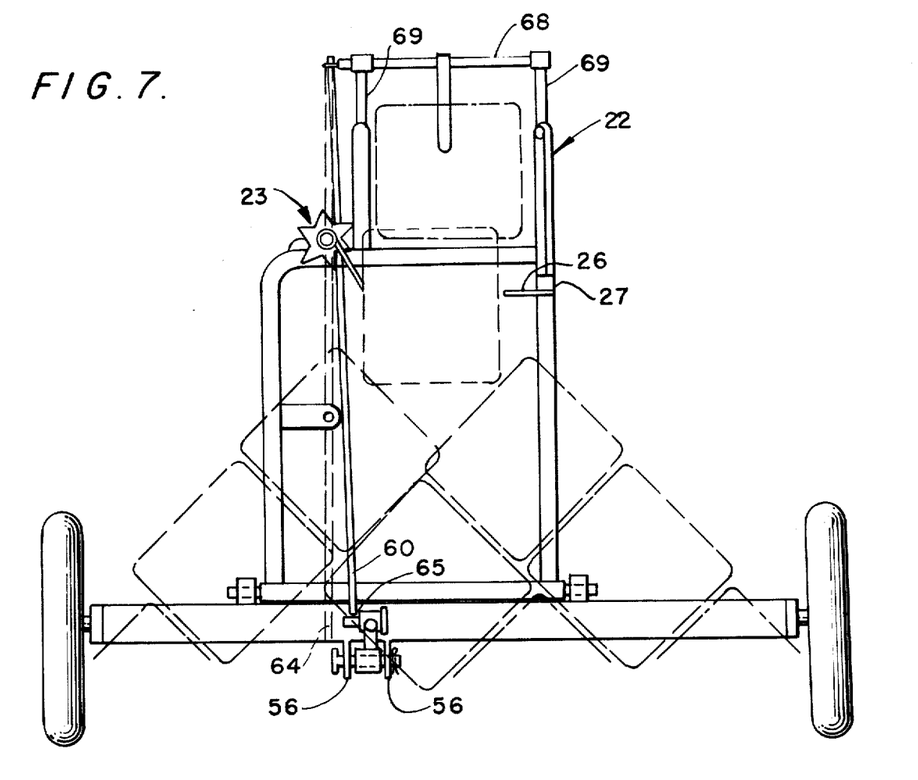
FIG. 7 is a further end elevation of the apparatus depicted in FIG. 2, in unloading condition.

The cross-member 49 includes a pair of lugs 56, FIG. 1 and FIG. 7 downwardly extending therefrom, spaced apart to receive in journalled pivoted relation, the rearward end of a pair of connecting rods 57 and 58, journally pivoted together in end-to-end relationship to form a double link generally designated 59, as depicted in FIG. 1. The forward end of the double link 59 is journally pivoted at 58a to a short horizontally disposed bracket 58b secured as by welding to the bottom of the stooker chassis as depicted in FIG. 1, in order to complete a locking bar assembly by means of which the bale platform 46 may be releasably locked in horizontal position, as will be hereinafter explained.

Stock Platform Release Mechanism

Trip means for release of the stock platform locking bar assembly comprises a trip bar 60 vertically slidable in a position against the stop member 31a of the bale support arm 23, being urged into lateral sliding engagement therewith by a tension spring 61, secured at its lower end to the trip bar 60 at a point 62 intermediate the ends thereof, and at its upper end to a spring bracket 63 secured to the adjacent main vertical frame 16 of the stooker, so that the spring 61 inclines inwardly-upwardly to induce lateral bias and upward bias upon the trip bar 50.

When the trip bar 60 is in sliding engagement with the stop member 31a, the lower end 64 of the trip bar 60 will be in position to operatively engage a stop 65 secured laterally on the link 57 of the locking bar assembly 59, as depicted in FIG. 1. The horizontal length of the stop 65 is such that when the trip bar 60 is moved laterally outwardly to the position depicted in phantom in FIG. 7 the lower end 64 of the trip bar 60 will be out of contact alignment with the stop member 31a in the generally vertical travel path of the trip bar 60.

The trip bar 60 is pivotally suspended at its upper end 66 from the forward end 67 of a bale trip arm 67a. The bale trip arm 67a is pivotally suspended at a point intermediate its ends by means of an axle 68 journalled horizontally thereto, and a pair of pivot brackets 69 secured to the horizontal members 19 of the main vertical frame members 16 and 16a. The distal end 70 of the bale trip arm 67a is bent downwardly in a compound curve in order to engage the upper surface 71 of each bale as it passes upwardly and rearwardly from the bale elevating ramp, as depicted in phantom in FIG. 1.

The tension spring 61, in addition to providing lateral bias on the trip bar 60 as is heretofore described, will also provide upwards bias on the trip bar and on the forward end 67 of the bale trip arm 67a, thereby downwardly biasing the distal end 70 thereof for contact against the upper surface 71 of each bale as it passes rearwardly from the bale elevating ramp 11 into the bale receiving and positioning station 21.

OPERATION

In operation, reference should be made initially to FIG. 1. Bales discharging from the bale chamber 10, with the major cross-sectional dimension is horizontal aspect, are pushed by succeeding bales up the bale elevation ramp 11, between the oppositely disposed upper lateral guides 12 and 13, supported by the single bottom guide 14, for introduction into the bale receiving and positioning station 21. As the leading end of the bale emerges from the bale elevation ramp 11, its upper surface 71 will contact the downwardly depending detent portion 70 of the bale trip arm 67a, thereby elevating the detent portion 70 of the bale trip arm 67a and depressing its opposite end 67, causing the trip bar 60 to move downwardly, for selective engagement or nonengagement with the stop 65 of the locking bar link assembly 59, as will be hereinafter described.

The bale is then urged forwardly, by the succeeding bales, and drops into the bale positioning station 21, with the major cross-sectional dimension in general horizontal aspect, as depicted in FIG. 2. The trip member 26 secured to the bale support arm 22 will engage the lower corner of the bale, causing it to angulate, before it comes to rest against the bale guide 39 of the opposite bale support arm 23, as depicted in FIG. 2. At this point, the bale will engage the first disc-stop 46 of the bale support arm 23, where further outward travel of the bale will cause longitudinal movement of the actuating rod 40 within the sleeve 38, against the biasing of the spring 45, until the catch 41 is released from the stop 43, whereupon the catch means 37, which includes the actuating arm 40, sleeve 38, and associated components, will be urged outwardly, counter-clockwise when viewed in FIG. 7, thereby permitting the bale to drop downwardly onto the bale platform 76. The balancing effort of the portion of the bale support arm 23 below the pivoted axles 35 and 36, will restore the orientation of the bale support arm to its normal vertical position, the roller catch 41 moving against the bevelled return surface 43a of the stop 43, for ultimate engagement behind the stop 43, where it is again rigidly secured, to receive the next following bale.

Figure 8:
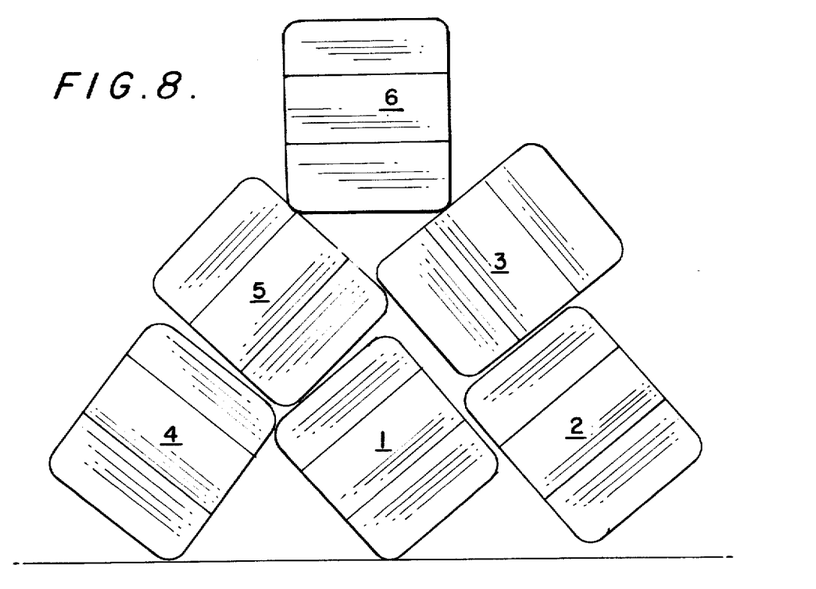
FIG. 8 shows an end view of a bale stock in pyramidal form on the ground, as it would appear after discharge from the carrier, depicting the normal numerical order of the bales as discharged from the baler, and the orientation of the bales within the stook.

The next four successive bales are elevated to the bale positioning station 21, and are discharged therefrom in fashion similar to bale member 1 heretofore described, but will assume predetermined positions in the pyramidal stook to be assembled on the bale platform 76, as depicted in FIG. 8. Bale number 2 will slide downwardly along the major side of bale number 1, having the same orientation, and will always be directed to the same side of bale number 1, by virtue of its initial contact with the side of bale number 1 having the major cross-sectional dimension and the offsetting of the apex of bale number 1 upon the stock platform below the discharge of the positioning station 21.

Bale number 3 will come to rest in the valley formed between bales number 1 and number 2, in 90° rotational relationship thereto, as depicted in FIG. 8. Bale number 4 will slide downwardly along the sloping surface formed by the major side of bale number 3 and the minor side of bale number 1, and will come to rest as depicted in FIG. 8 in similar aspect with bale number 3. Bale number 5 will come to rest in 90° rotational aspect to bale number 4, and bale number 6 will be discharged from the bale receiving and positioning station 21 in essentially the same aspect as its supported aspect therein, before release of the bale by the catch means 37.

Thus, a pyramidal stook is assembled, as depicted in FIG. 8, in which the bales are assembled in an interlocking arrangement, having adequate voids between adjacent bales and between the lowermost bales and the ground, in order to facilitate air circulation within the stock.

When bale number 6 has been dropped into position in the assembled stock upon the bale platform 76, it presence will prevent the bale support arm 23 from returning to its normal vertical position, but will remain extending laterally, as depicted in FIG. 7. This condition causes the stop member 31a of the bale support arm 23 to move inwardly, permitting the trip bar 60 to move laterally inwardly under spring biasing 61, thereby bringing the lower end 64 of the trip bar 60 into contact alignment with the stop member 31a. When the next through-passing bale comes into engagement with the distal end 70 of the bale trip-arm 67a, causing it to elevate and the trip bar 60 to move downwardly, as heretofore described, the lower end 64 of the trip 60 will then move the stop 65 downwardly, serving to disengage the locking bar assembly 59, and the weight of the bales on the forked teeth of the platform 76 will tilt the platform downwardly, the locking bar assembly 59 moving to the position depicted in broken outline in FIG. 1, thereby permitting the assembled stock to come into groundengagement, and to slide off the forks for deposition on the surface of the ground.

When the pyramidal stook has been discharged, the weight of the stooker assembly upon the stub 55, will return the platform to horizontal position, the pivotal connection of the links 57 and 58 of the locking bar assembly 59 moving upwardly above the pivotal connection of the locking bar 59 at pivots 56 and 58a, causing the locking bar assembly to come into upward engagement against the bracket 58b, thereby locking the platform 76 against downward movement.

In travel, articulation of the stooker assembly is provided for by means of the telescopic guide 12, 13 and 14, which permit short radius turns of the travelling baler and stooker in tow.

The pyramidal stocks, when deposited on the ground, are formed with interior ventilation voids and are open for ventilation underneath, as depicted in FIG. 8.

It will be apparent that the embodiment shown is primarily exemplary, and that various modifications can be made in construction and arrangement of the component parts within the scope of the invention as defined in the appended claims.

What I claim as my invention is:
1. A stooker for the automatic construction and deposit of a stock from bales discharged from a travelling baler comprising, in combination:
   i. bale elevating means for receiving and elevating bales discharged from said baler;
   ii. a bale receiving and positioning station for receiving bales from said bale elevating means and for angularly positioning thereof in a predetermined elevated deposit position, said pale receiving and positioning station comprising a pair of horizontally extending parallel bale receiving arms and bale support means on said bale support arms adapted to engage and support a bale, at least one of said bale support means being pivotably mounted upon an associated said bale support arm, and bale engag- ing and tripping means associated with one of said bale support arms to effect angulations of said bale within said station;

iii. bale release means for programmed release of bales from said bale receiving and positioning station whereby each of said bales is deposited at a predetermined position in a stook being formed, said bale release means comprising means for selectively locking and releasing said pivotable bale support means responsive to the position of a bale upon said pair of bale receiving arms;

iv. a stock forming platform adapted to receive bales upon release thereof by said bale release means for assembly of a stock thereon;

v. stook dump means responsive to the movement of bales into the bale receiving and positioning station and the assembly condition of the stook under construction on the stook forming platform for discharge of assembled stooks from said stook forming platform to the surface of the ground.

2. Apparatus according to claim 1 in which said stook dump means is responsive to the movement of bales into the bale receiving and positioning station and the completion of the stook under construction on the stook forming platform.

3. Apparatus according to claim 1 in which said bales are of rectangular cross-sectional configuration and unequal cross-sectional dimensions and additionally comprising means for depositing each of said bales in a predetermined orientation in a stook being formed.

4. In a bale stooker as set out in claim 1, and, in which said stook is a six-bale pyramidal stook of 3 - 2 - 1 configuration, and said bales are of rectangular cross-sectional configuration and substantially unequal cross-sectional dimensions, and thereby define adjacent major and minor side surfaces, said bale release means comprising:

means for selectively locking and releasing said pivotable bale support means responsive to the position of a bale upon said pair of bale receiving arms for programmed release of bales from said bale receiving and positioning station whereby each of said bales is deposited at a predetermined position in a predetermined orientation in a stook being formed, in the sequential order of:

a. the first bale discharged therefrom assuming the center position in the bottom row, with its greater cross-sectional dimension inclined in a first orientation at approximately 45° to the ground surface, and thereby presenting a major and a minor side as the two upwardly disposed surfaces thereof;

b. the second bale discharged therefrom assuming the position adjacent to said first bale in similar first orientation thereto and overlying a substantial portion of the major upper surface thereof;

c. the third bale discharged therefrom assuming a position in the second row upon the upper surfaces of said first and second bales and assuming a second orientation substantially at right angles to said first orientation;

d. the fourth bale discharged therefrom assuming the position adjacent to said first bale on the side thereof opposite to said second bale, and assuming said second orientation and overlying a substantial portion of the minor upper surface of said first bale;

e. the fifth bale discharged therefrom assuming the position in the second row adjacent to said third bale upon the adjacent upper surfaces of said first and fourth bales and assuming said first orientation; and f. the sixth bale discharged therefrom assuming the apex position in said stook in the third row thereof upon the adjacent upper surfaces of said third fifth bales;

and wherein said stook forming platform is adapted to receive each of said bales upon release thereof by said bale release means for assembly thereof, in said sequential order, in a six-bale pyramidal stook thereon of said 3 - 2 - 1 configuration; and said stook dump means is responsive to the movement of bales into the bale positioning station and the completion of the stook under construction on the stook forming platform, for discharge of said assembled six-bale pyramidal stook from said stook forming platform to the surface of the ground.

5. Apparatus for the automatic construction and deposit of a pyramidal stook from bales adapted for use with a travelling baler comprising in combination:

i. a generally horizontally disposed ground-supported chassis and hitch means articulatingly connecting said chassis with said travelling baler;

ii. a bale elevating ramp in which bales are upwardly urged in response to the discharge of bales from the travelling baler;

iii. a bale receiving and positioning station for receiving bales from said bale elevating means and for positioning and orientation thereof in a predetermined elevated release position, said bale receiving and positioning station comprising a pair of horizontally extending parallel bale receiving arms and bale support means on said bale support arms adapted to engage and support a bale, at least one of said bale support means being pivotally mounted upon an associated said bale support arm, and bale engaging and tripping means associated with one of said bale support arms to effect angulation of said bale within said station;

iv. bale release means for the programmed release of bales from said bale receiving and positioning station whereby each of said bales is deposited at a predetermined position and in a predetermined orientation in a stook being formed, said bale release means comprising means for selectively locking and releasing said pivotable bale support means responsive to the position of a bale upon said pair of bale receiving arms;

v. a stook forming platform adapted to receive each of said bales upon release thereof by said bale release means for assembly thereon of a six-bale pyramidal stook of a 3-2-1 configuration; and vi. stook dump means responsive to the movement of bales into said bale receiving and positioning station and the completion of the stook under construction of the stook forming platform for the discharge of assembled stooks from said stook forming platform to the surface of the ground.

6. Apparatus according to claim 5 in which said bale receiving and positioning station and said bale release means include two horizontally disposed, parallel rearwardly extending bale receiving arms mounted upon said chassis and operatively connected with the discharge end of said bale elevating means, said bale receiving arms each having inwardly inclined detent members adapted to support bales thereby, at least one of which detent members is downwardly pivotally releasable in response to the rearward movement of the bales between said bale receiving arms and moveable between a first position for supporting a bale discharged on said bale receiving arms from said bale elevating means and a second release position for downward release of the bale therefrom.

7. Apparatus according to claim 5 in which said stook forming platform includes a ground wheel assembly including a pair of stub axle-mounted wheels; a pair of rearwardly extending parallel mounting arms to each of which one of said stub axle-mounted wheels is fixedly connected; a horizontal axle shaft fixedly connected at right angles to said mounting arms and laterally disposed underlying said chassis; a plurality of rearwardly generally horizontally extending tine members fixedly connected at right angles to said axle shaft and forming a forked bale platform therewith; platform pivot means for mounting said axle to said chassis; a double-link locking bar having its rearward end pivotally secured to said axle shaft and its forward end pivotally secured to said chassis, operatively moveable between a locked position and an unlocked position for pivot movement of said bale platform about said platform pivot means; a generally vertically disposed trip bar slidable vertically, selectively engaging at its lower end said double-link locking bar; a horizontally disposed bale trip arm pivotally secured intermediate the ends thereof adjacent said bale receiving and positioning station and pivotally secured at its forward end to said trip bar and having a downwardly turned opposite distal end introduced into said bale receiving and positioning station and adapted for upward movement thereof in response to contact with bales passing into said bale receiving and positioning station from said bale elevating means; biasing means for normal upwards biasing of said trip bar and normal downwards biasing of said distal end of said trip bar; and trip bar guidance means for guidance of said trip bar between a first position of operating engagement with said double-link locking bar and a second position of non-engagement therewith, in response to the completion state of a stook under construction upon said bale platform.

8. Apparatus for the automatic construction and deposit of a six-bale pyramidal stook in a 3-2-1 configuration from bales adapted for use with a travelling baler comprising, in combination:
i. a generally horizontally disposed ground-supported chassis and hitch means articulating by connecting said chassis with said travelling baler;
ii. bale elevating means in which bales are upwardly urged in response to the discharge of bales from the travelling baler;
iii. a bale positioning station for receiving bales from said bale elevating means and for positioning and orientation thereof in a predetermined deposit position;
iv. bale release means for the programmed release of bales from said bale positioning station whereby each of said bales is deposited at a predetermined position and in a predetermined orientation in a stook being formed;
v. a stook forming platform adapted to receive each of said bales upon release thereof by said bale release means for assembly thereof, in said sequential order, of a six-bale pyramidal stook thereon of said 3 - 2 - 1 configuration, said stook forming platform comprising a ground wheel assembly including a pair of stub axle-mounted wheels; a pair of rearwardly extending parallel mounting arms to each of which one of said stub axlemounted wheels is fixedly connected; a horizontal axle shaft fixedly connected at right angles to said mounting arms and laterally disposed underlying said chassis; a plurality of rearwardly generally horizontally extending tine members fixedly connected at right angles to said axle shaft and forming a forked bale platform therewith; platform pivot means for mounting said axle to said chassis; a double-link locking bar having its rearward end pivotally secured to said axle shaft and its forward end pivotally secured to said chassis, operatively moveable between a locked position and an unlocked position for pivot movement of said bale platform about said platform pivot means; a generally vertically disposed trip bar slidable vertically, selectively engaging at its lower end said double-link locking bar; a horizontally disposed bale trip arm pivotally secured intermediate the ends thereof adjacent said bale receiving and positioning station and pivotally secured at its forward end to said trip bar and having a downwardly turned opposite distal end introduced into said bale receiving and positioning station and adapted for upward movement thereof in response to contact with bales passing into said bale receiving and positioning station from said bale elevating means; biasing means for normal upwards biasing of said trip bar and normal downwards biasing of said distal end of said trip bar; and trip bar guidance means for guidance of said trip bar between a first position of operating engagement with said double-link locking bar and a second position of non-engagement therewith, in response to the completion state of a stook under construction upon said bale platform; and
vi. stook release means responsive to the movement of bales into the bale positioning station and the completion of the stook under construction on the stook forming platform for the discharge of assembled stooks from said stook forming platform to the surface of the ground.

9. Apparatus according to claim 8 in which said trip bar guidance means includes a downwardly extending portion of said pivotally releaseable bale receiving arm adapted to urge said trip bar into engagement with said double-link locking bar when said pivotally releaseable bale receiving arm is restricted laterally in response to the positioning of an uppermost bale of a stook formed upon said bale platform; and spring biasing means to urge normally said trip bar into non-engagement with said double-link locking bar.

10. A method of constructing a six-bale stook of 3 - 2 - 1 configuration of bales of rectangular cross-sectional configuration having unequal cross-sectional dimensions comprising the steps of:
i. elevating each of said bales sequentially to a bale positioning station such that the major cross-section of each of said bales is substantially horizontal;
ii. similarly positioning each of said bales within said station between bale receiving arm means by contacting a longitudinal side of said bale with a portion of said arm means, and thereby angulating each of said bale about the longitudinal axis thereof into a predetermined deposit position;

iii. pushing the preceding said bale with the elevated subsequent said bale along said arm means thereby causing actuation of said arm means and permitting each of said bales to immediately drop unimpeded sequentially downwardly into stook assembled position upon a stook platform, in the sequential order of:

a. the first bale discharged therefrom assuming center position in the bottom row, with its greater cross-sectional dimension inclined in a first orientation at approximately 45° to the ground surface, and thereby presenting a major and a minor side as the two upwardly disposed surfaces thereof;

b. the second bale discharged therefrom assuming the position adjacent to said first bale in similar first orientation thereto and overlying a substantial portion of the major upper surface thereof, said second bale assuming said position solely by contacting one side of said first bale and sliding down said contacted side;

c. the third bale discharged therefrom assuming a position in the second row upon the upper surfaces of said first and second bales and assuming a second orientation substantially at right angles to said first orientation, said third bale assuming said position solely by contacting said upper surfaces of said first and second bales;

d. the fourth bale discharged therefrom assuming the position adjacent to said first bale on the side thereof opposite to said second bale, and assuming said second orientation and overlying a substantial portion of the minor surface of said first bale, said fourth bale assuming said position solely by contacting said third and first bales;

e. the fifth bale discharged therefrom assuming the position in the second row adjacent to said third bale upon the adjacent upper surfaces of said first and fourth bales and assuming said first orientation, said fifth bale assuming said position solely by contacting said first, third and fourth bales; and f. the sixth bale discharged therefrom assuming the apex position in said stook in the third row thereof upon the adjacent upper surfaces of said third and fifth bales, said sixth bale assuming said position solely by contacting said third and fifth bales; and iv. actuating a stook release means and depositing said stook so formed upon the surface of the ground.

11. A method of constructing a six-bale stook as claimed in claim 10 wherein said stook release means is actuated by the bale following said sixth bale.

* * * * *